United States Patent
Yang

(10) Patent No.: US 11,201,652 B2
(45) Date of Patent: *Dec. 14, 2021

(54) METHOD FOR REPORTING TERMINAL INFORMATION, METHOD FOR ACQUIRING TERMINAL INFORMATION, TERMINAL AND BASE STATION

(71) Applicant: VIVO MOBILE COMMUNICATION CO., LTD., Chang'an DongGuan (CN)

(72) Inventor: Yu Yang, Chang'an DongGuan (CN)

(73) Assignee: VIVO MOBILE COMMUNICATION CO., LTD., Chang'an Dongguan (CN)

( * ) Notice: Subject to any disclaimer, the term of this patent is extended or adjusted under 35 U.S.C. 154(b) by 0 days.

This patent is subject to a terminal disclaimer.

(21) Appl. No.: 16/888,799

(22) Filed: May 31, 2020

(65) Prior Publication Data

US 2020/0328791 A1  Oct. 15, 2020

Related U.S. Application Data

(63) Continuation of application No. 16/347,024, filed as application No. PCT/CN2017/108652 on Oct. 31, 2017, now Pat. No. 10,707,935.

(30) Foreign Application Priority Data

Nov. 4, 2016  (CN) .......................... 201610964991.4

(51) Int. Cl.
| | |
|---|---|
| H04B 7/02 | (2018.01) |
| H04B 7/06 | (2006.01) |
| H04B 7/0452 | (2017.01) |
| H04W 74/08 | (2009.01) |
| H04W 72/12 | (2009.01) |
| H04W 74/00 | (2009.01) |
| H04B 7/0413 | (2017.01) |

(52) U.S. Cl.
CPC ......... *H04B 7/0621* (2013.01); *H04B 7/0452* (2013.01); *H04B 7/0628* (2013.01);
(Continued)

(58) Field of Classification Search
CPC .. H04B 7/0621; H04B 7/0628; H04B 7/0452; H04B 7/0413; H04W 74/00;
(Continued)

(56) References Cited

U.S. PATENT DOCUMENTS

| | | | |
|---|---|---|---|
| 10,707,935 B2 * | 7/2020 | Yang | H04B 7/0628 |
| 2012/0281556 A1 * | 11/2012 | Sayana | H04L 5/0035 |
| | | | 370/252 |

(Continued)

FOREIGN PATENT DOCUMENTS

| | | |
|---|---|---|
| CN | 102291759 A | 12/2011 |
| CN | 105471484 A | 4/2016 |
| WO | 2016091307 A | 6/2016 |

OTHER PUBLICATIONS

U.S. Appl. No. 16/347,024, Non-Final Official Action dated Nov. 25, 2019, 28 pages.

(Continued)

*Primary Examiner* — Don N Vo
(74) *Attorney, Agent, or Firm* — Getech Law LLC; Jun Ye

(57) ABSTRACT

A method for reporting terminal information, a method for acquiring terminal information, a terminal and a base station are provided. The method for reporting terminal information includes: transmitting a setting parameter of an antenna structure of a terminal to a base station, where the setting parameter includes a radio frequency parameter; where the radio frequency parameter includes one or more of: a quantity of panels, frequency information supported by each panel, a quantity of beams supported by each panel, and a quantity of antenna array polarization directions of each panel.

15 Claims, 9 Drawing Sheets

(52) U.S. Cl.
CPC ........... *H04W 72/12* (2013.01); *H04W 74/00* (2013.01); *H04W 74/08* (2013.01); *H04W 74/0833* (2013.01); *H04B 7/0413* (2013.01)

(58) Field of Classification Search
CPC . H04W 74/08; H04W 72/12; H04W 74/0833; H04W 74/004; H04W 72/1284
USPC ........................................................ 375/267
See application file for complete search history.

(56) References Cited

U.S. PATENT DOCUMENTS

| | | |
|---|---|---|
| 2015/0011215 A1 | 1/2015 | Uemura et al. |
| 2015/0092875 A1 | 4/2015 | Kim et al. |
| 2015/0334748 A1 | 11/2015 | Yu |
| 2016/0157258 A1* | 6/2016 | Saiwai .................. H04W 76/14 370/329 |
| 2016/0338013 A1* | 11/2016 | Yu .......................... H04L 1/0075 |
| 2017/0214443 A1 | 7/2017 | Chen |
| 2018/0034531 A1* | 2/2018 | Sadiq .................. H04W 72/046 |
| 2018/0124774 A1 | 5/2018 | Takahashi et al. |
| 2018/0227094 A1* | 8/2018 | Liu ....................... H04L 5/0094 |
| 2018/0262259 A1 | 9/2018 | Sano et al. |
| 2019/0181921 A1* | 6/2019 | Lee .......................... H04B 7/06 |

OTHER PUBLICATIONS

PCT/CN2017/108652, International Search Report and Written Opinion with English translation of IPRP dated May 16, 2019, 17 pages.

\* cited by examiner

METHOD FOR REPORTING TERMINAL INFORMATION, METHOD FOR ACQUIRING TERMINAL INFORMATION, TERMINAL AND BASE STATION

CROSS REFERENCE OF RELATED APPLICATION

This application is a continuation of U.S. patent application Ser. No. 16/347,024, filed on May 2, 2019, which claims priority to U.S. National Phase Application No. PCT/CN2017/108652 filed on Oct. 31, 2017, which claims priority to Chinese Patent Application No. 201610964991.4, filed on Nov. 4, 2016, the contents of the above-referenced applications are hereby expressly incorporated herein by reference in their entirety.

TECHNICAL FIELD

The present disclosure relates to the field of communication technologies, and in particular, to a method for reporting terminal information, a method for acquiring terminal information, a terminal and a base station.

BACKGROUND

The radio access technology standards such as LTE (Long Term Evolution)/LTE-A (LTE-Advanced) are built based on MIMO (Multiple-Input Multiple-Output)+OFDM (Orthogonal Frequency Division Multiplexing) technology. The MIMO technology utilizes the spatial freedom that multi-antenna systems can achieve to improve peak rate and system spectrum utilization.

The dimensions of MIMO technology continue to expand during the development of standardization. In LTE Rel-8, up to 4 layers of MIMO transmission can be supported. The RC-MIMO (Multi-User MIMO) technology, TM (Transmission Mode)-8 MU-MIMO transmission can support up to four downlink data layers. The transmission capability of SU-MIMO (Single-User MIMO) is extended to a maximum of 8 data layers in Rel-10.

The industry is further promoting the MIMO technology to be three-dimensional and large-scale. At present, 3GPP has completed research projects on 3D channel modeling, and is conducting research and standardization of eFD-MIMO (evolved Full-Dimension MIMO) and NR MIMO (New Radio MIMO). It is foreseeable that in the future 5G mobile communication system, a larger scale, more antenna port MIMO technology will be introduced.

Massive (large-scale) MIMO technology uses large-scale antenna arrays to greatly increase system bandwidth utilization and support a larger number of access users. Therefore, major research organizations regard massive MIMO technology as one of the most promising physical layer technologies in the next generation of mobile communication systems.

In the massive MIMO technology, if an all-digital array is used, a maximum spatial resolution and optimal MU-MIMO performance may be achieved, but this structure requires a large number of AD/DA (analog-to-digital/digital-to-analog) conversion devices and a large number of complete RF-baseband processing channels, whether it is equipment cost or baseband processing complexity, will be a huge burden.

In order to avoid the above implementation cost and equipment complexity, digital-analog hybrid beamforming technology emerges, which is based on the traditional digital domain beamforming, adding a first-order beam assignment to the RF signal near the front end of the antenna system. Analog shaping enables a relatively coarse match between the transmitted signal and the channel in a relatively simple manner. The dimension of the equivalent channel formed after the analog shaping is smaller than the actual number of antennas, so the required AD/DA conversion device, the number of digital channels, and the corresponding baseband processing complexity can be greatly reduced. The residual interference of the analog shaped portion can be processed again in the digital domain to ensure the quality of the MU-MIMO transmission. Compared with full digital shaping, digital-analog hybrid beamforming is a compromise between performance and complexity. It has a high practical prospect in systems with high bandwidth and large number of antennas.

In the current LTE system, the UE (User Equipment, or referred to as terminal) is allowed to have different product costs and applications. Then, the UE can report its own access network capability, and the network side can provide the network. A better service that matches the capabilities of the UE. That is to say, when the network side makes various event decisions or executes various algorithms, it needs to know the capabilities of the UE to make the most appropriate decision.

In the UE EUTRA capability (the evolved UMTS land-based radio access capability of the UE), the following message content is included:

a. access layer release: set to the 3GPP version number supported by the UE;

b. UE category (category);

c. PDCH (Packet Data Channel) parameters: describe the ROHC profile (Robust Header Compression Profile) combination supported by the UE, and the maximum number of header compression context sessions supported by the UE, etc.;

d. Physical layer parameters: whether the UE supports antenna selection, whether the UE supports UE specific RS (specific reference signal) for downlink support under FDD (frequency division duplex);

e. RF (Radio Frequency) parameters: indicate the EUTRA band that the UE can support, whether the UE supports half-duplex or full-duplex, etc.

f. measurement parameters: including whether or not measurement gaps (measurement gaps), etc.;

g. Feature group indicators (FGI): Supports the execution and testing of all functions when the specific indicator is "True", otherwise it is "false", setting all unsupported functions to "false".

h. InterRAT (different system cell handover) parameters: refers to the UE's ability to support different systems, which is an important basis for the network side to determine whether the UE can interoperate.

In the UE EUTRA capability, the parameters of the UE category define the uplink and downlink capabilities of the UE, including:

The downlink physical layer parameter value series includes: a total number of bits of the DL-SCH (downlink shared channel) transport block received in one TTI (transmission time interval), and a DL-SCH transport block received in one TTI The maximum number of bits, the total number of soft channel bits, the maximum number of spatial multiplexing layers supported by the downlink, and the like.

The uplink physical layer parameter value series includes: the total maximum number of bits of the UL-SCH (uplink shared channel) transport block received in one TTI, the maximum number of bits included in one UL-SCH transport block received in one TTI, and the uplink whether to support 64 QAM (phase quadrature amplitude modulation) and the like.

L2 buffer size, etc.

It should be noted that when the capability reporting of the UE is the first ATTACH (attachment) or TAU (tracking area update) of the UE, the UE actively reports its own capability, which belongs to the NAS (non-access stratum) process. In the RRC (Radio Resource Control) specification at the network side also has a UE capability query process to acquire and deliver UE capabilities, including:

1) First, the UE boots up and establishes synchronization and access with the network, namely:

1.1、The UE sends an RA preamble (random access preamble) to the base station;

1.2、The base station sends an RA response (random access response) to the UE;

1.3、The UE sends an RRC Connection Request to the base station;

1.4、The base station sends an RRC Connection Setup to the UE;

1.5、The UE sends an RRC Connection Setup Complete to the base station to complete the establishment of the RRC connection.

2) The base station sends an Initial UE message to the MME (Mobility Management Entity), including: Attach Request, PDN connectivity request message, and the like.

3) The MME sends an Initial context setup request to the base station, including: Attach Accept, Activate default EPS bearer context request, to complete the connection of S1. By completing these procedures, it is indicated that the establishment of the NAS signaling connection (non-access stratum signaling connection) is completed.

4) If the UE Radio Capability IE (radio capability information element) is carried in the above message Initial context setup request, the base station does not send a UE Capability Enquiry message to the UE. Otherwise, the base station will initiate a UE capability enquiry procedure, which is often seen in the first network access, that is:

4.1、The base station sends the UE Capability Enquiry to the UE;

4.2、The UE sends UE Capability Information to the base station. The base station then sends a UE Capability info Indication to the MME. That is, the UE reports its own wireless capability information, and the base station then reports the wireless capability information of the UE to the core network.

It can be seen from the description that when mass MIMO uses digital analog hybrid beamforming technology, the corresponding antenna array structure will be designed. For example, adding a panel, each panel can be connected to the corresponding baseband unit and sent to each. The analog beam and the array of panels can be digitally shaped to achieve coverage of a specific geographic area.

In the UE capability design and reporting in the related art, if there is not such antenna array structure information message, then in the subsequent use procedure, it is impossible to provide a more efficient beam management, more precise beam alignment, more optimized multi-user scheduling and multi-data flow transmission to the system when using more antennas for user scheduling and data transmission.

SUMMARY

The present disclosure provides a method for reporting terminal information, a method for acquiring terminal information, a terminal and a base station, so as to solve the problem that the network side in the related art does not understand the antenna array structure information on the terminal, and cannot provide a more efficient beam management, more precise beam alignment, more optimized multi-user scheduling and multi-data flow transmission to the system when using more antennas for user scheduling and data transmission in the subsequent use procedure.

In a first aspect, a method for reporting terminal information is provided in the present disclosure, applied to a terminal and including:

transmitting a setting parameter of an antenna structure of a terminal to a base station, where the setting parameter includes a radio frequency parameter;

the radio frequency parameter includes one or more of: a quantity of panels, frequency information supported by each panel, a quantity of beams supported by each panel, and a quantity of antenna array polarization directions of each panel.

In a second aspect, a terminal is further provided in the present disclosure, including:

a first transmitting module, configured to transmit a setting parameter of an antenna structure of a terminal to a base station, where the setting parameter includes a radio frequency parameter; where the radio frequency parameter includes one or more of: a quantity of panels, frequency information supported by each panel, a quantity of beams supported by each panel, and a quantity of antenna array polarization directions of each panel.

In a third aspect, a method for acquiring terminal information is further provided in the present disclosure, applied to a base station and including:

receiving a setting parameter of an antenna structure of a terminal sent by a terminal, where the setting parameter includes a baseband parameter and/or a radio frequency parameter;

the baseband parameter includes: a quantity of transceiver units supported by the terminal;

the radio frequency parameter includes one or more of: a quantity of panels, frequency information supported by each panel, a quantity of beams supported by each panel, and a quantity of antenna array polarization directions of each panel.

In a fourth aspect, a base station is further provided in the present disclosure, including:

a first receiving module, configured to receive a setting parameter of an antenna structure of a terminal sent by a terminal, where the setting parameter includes a radio frequency parameter;

the radio frequency parameter includes one or more of: a quantity of panels, frequency information supported by each panel, a quantity of beams supported by each panel, and a quantity of antenna array polarization directions of each panel.

In a fifth aspect, a terminal is further provided in the present disclosure, including a memory, a processor and computer program stored in the memory and operable on the processor, where the processor executes the computer program to perform the method for reporting terminal information hereinabove.

In a sixth aspect, a base station is further provided in the present disclosure, including a memory, a processor and a computer program stored in the memory and operable on the processor, where the processor executes the computer program to perform the method for acquiring terminal information hereinabove.

According to the embodiments of the present disclosure, the terminal sends the setting parameter of its own antenna structure to the base station, so that the network side knows the antenna array structure information of the terminal, and then in the subsequent use, the network side is able to provide a more efficient beam management, more precise beam alignment, more optimized multi-user scheduling and multi-data flow transmission to the system when using more antennas for user scheduling and data transmission.

BRIEF DESCRIPTION OF THE DRAWINGS

In order to make the technical solutions of the present disclosure more clearly, the drawings in the embodiments of the present disclosure will be described hereinafter in a simple manner. Obviously, the following drawings merely relate to a part of the embodiments of the present disclosure. A person skilled in the art may, without any creative effort, obtain the other drawings based on these drawings.

DETAILED DESCRIPTION

Figure 1:
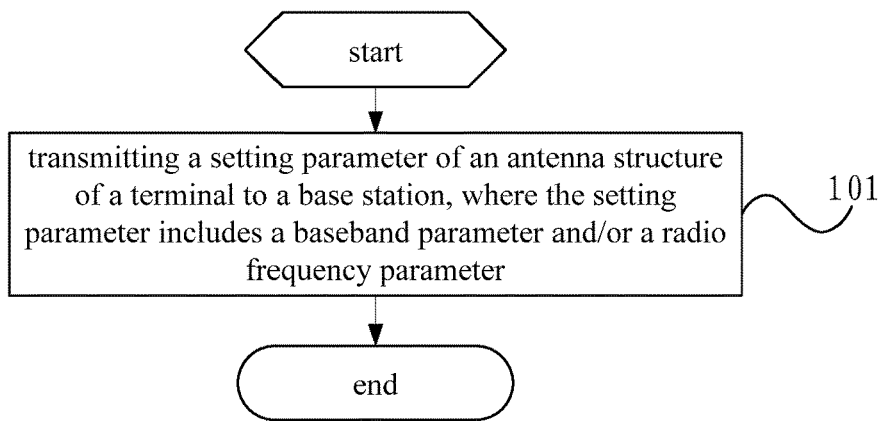
FIG. 1 is a flowchart of a method for reporting terminal information in some embodiments of the present disclosure.

The present disclosure will be described hereinafter in a clear and complete manner in conjunction with the drawings and embodiments. Obviously, the following embodiments merely relate to a part of, rather than all of, the embodiments of the present disclosure, and based on these embodiments, a person skilled in the art may, without any creative effort, obtain the other embodiments, which also fall within the scope of the present disclosure FIG. 1 is a flowchart of a method for reporting terminal information in some embodiments of the present disclosure. The implementation process of the method for reporting terminal information will be specifically described below in conjunction with FIG. 1.

A method for reporting terminal information is provided in some embodiments of the present disclosure, applied to a terminal and including:

Step 101: transmitting a setting parameter of an antenna structure of a terminal to a base station, where the setting parameter includes a baseband parameter and/or a radio frequency parameter.

It should be noted that the baseband parameter includes: a quantity of transceiver units (TxRU) supported by the terminal.

The radio frequency parameter includes one or more of: a quantity of panels, frequency information supported by each panel, a quantity of beams supported by each panel, and a quantity of antenna array polarization directions of each panel.

Figure 2:
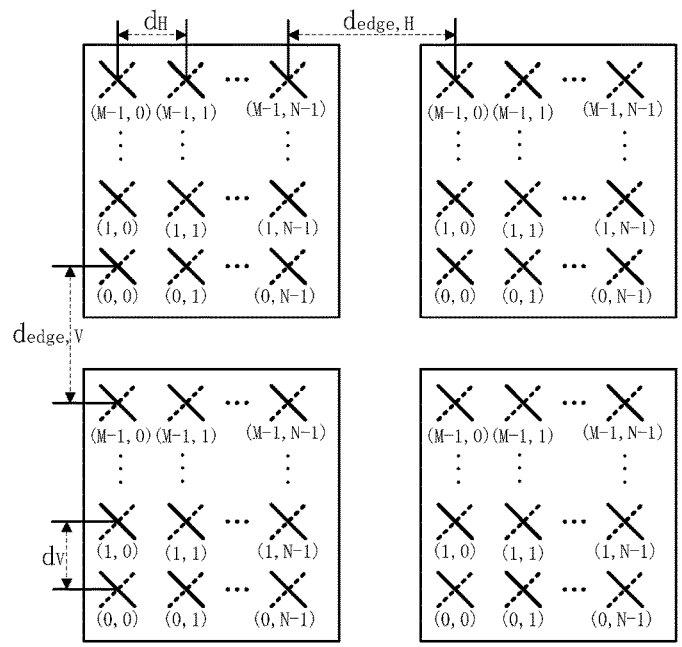
FIG. 2 is a schematic view of a large-scale antenna array.

For example, FIG. 2 is a schematic view of a large-scale antenna array. In FIG. 2, all antenna arrays are divided into different panels, and each panel is composed of a dual-polarized array, and each linear line represents an antenna element of one polarization direction. A quantity of antenna elements, the supported high and low frequency bands and the like of respective panels may be different.

According to the method for reporting terminal information in some embodiments of the present disclosure, the terminal sends the setting parameter of its own antenna structure to the base station, so that the network side knows the antenna array structure information of the terminal, and then in the subsequent use, the network side is able to provide a more efficient beam management, more precise beam alignment, more optimized multi-user scheduling and multi-data flow transmission to the system when using more antennas for user scheduling and data transmission.

Figure 3:
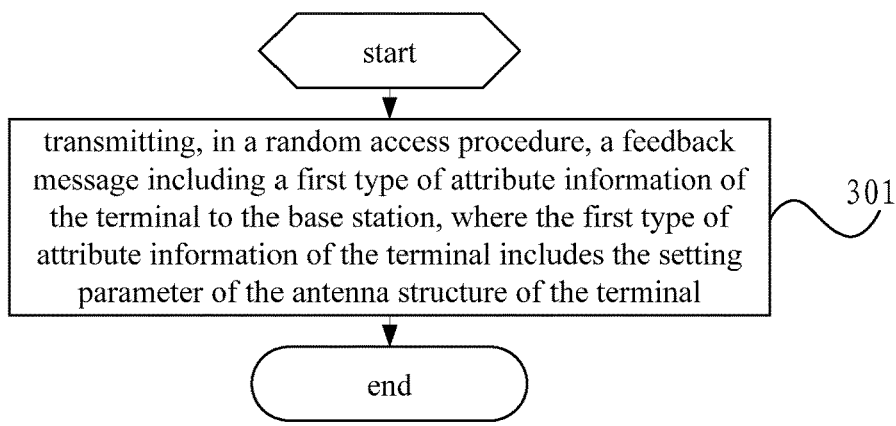
FIG. 3 is a flowchart of a method for reporting terminal information in some embodiments of the present disclosure.

FIG. 3 is a flowchart of a method for reporting terminal information in some embodiments of the present disclosure. The implementation process of the method for reporting terminal information will be specifically described below in conjunction with FIG. 3.

A method for reporting terminal information is provided in some embodiments of the present disclosure, applied to a terminal and including:

Step 301: transmitting, in a random access procedure, a feedback message including a first type of attribute information of the terminal to the base station, where the first type of attribute information of the terminal includes the setting parameter of the antenna structure of the terminal.

It should be noted that the first type of attribute information in some embodiments of the present disclosure refers to a setting parameter of the antenna structure of the terminal, and other capability information of the terminal may be referred to as a second type of attribute information, and the second type of attribute e information is the same as the parameters included in the UE EUTRA capability mentioned in the background art, and will not be described in detail herein.

In this step, it is to transmit the setting parameter of the antenna structure of the terminal to the base station in a random access procedure.

It should be noted that, the baseband parameter includes: a quantity of transceiver units supported by the terminal; the radio frequency parameter includes one or more of: a quantity of panels, frequency information supported by each panel, a quantity of beams supported by each panel, and a quantity of antenna array polarization directions of each panel. The feedback message may be a random access preamble message (RA Preamble) or a radio resource control (RRC) connection request message.

It should be noted that, in order to enable the base station to transmit the downlink data better, the terminal needs to feed back the optimal downlink transmission beam to the base station. In some embodiments of the disclosure, the terminal uses two modes to report the optimal downlink transmission beam.

Mode I

Before Step 301, the method for reporting terminal information in some embodiments of the present disclosure further includes:

prior to the random access procedure, determining optimal downlink transmitting beam information measured on each panel by the terminal, based on a receiving strength of a synchronization signal sent by the base station.

Further, Step 301 further includes: transmitting, in the random access procedure, the feedback message including the first type of attribute information of the terminal and the optimal downlink transmitting beam information measured on each panel by the terminal to the base station.

It should be noted that, in the first mode, before the random access, based on the synchronization signal of the base station, the panels respectively measures the corresponding optimal downlink transmission beam, and the optimal downlink transmission beam refers to the downlink transmitting beam with the highest signal strength which is measured by the terminal. In the random access, the terminal reports the optimal downlink transmitting beam of each panel and the first type of attribute information of the terminal to the base station.

Figure 4:
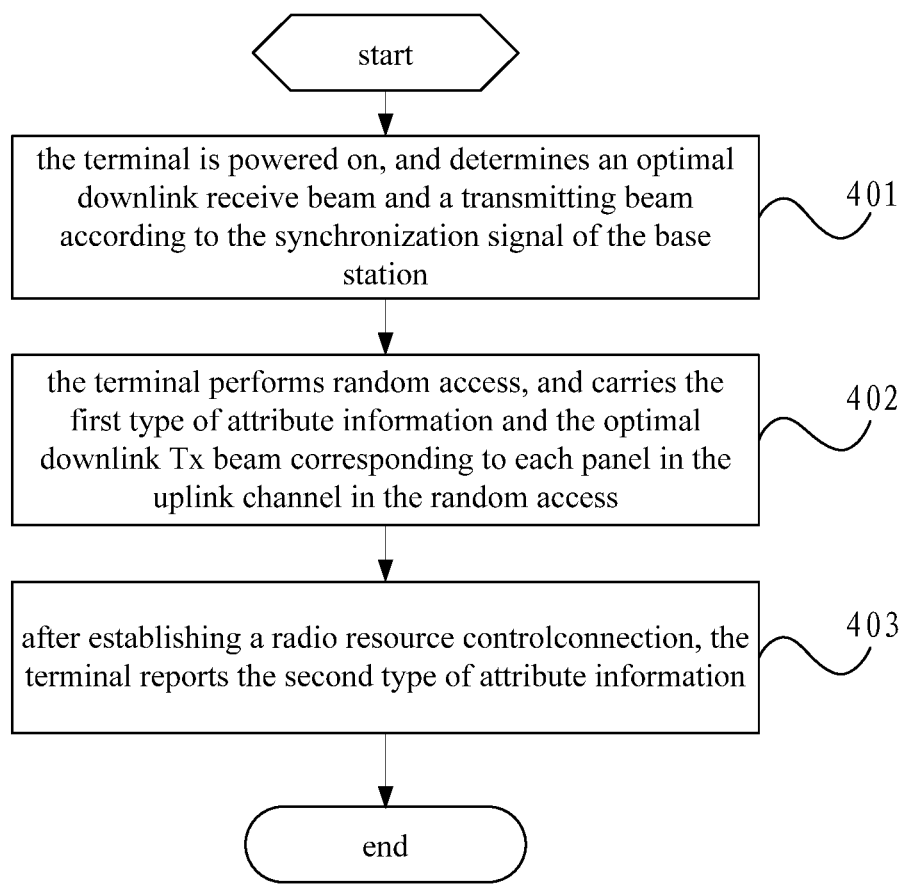
FIG. 4 is a schematic view showing a specific implementation process of Mode I in practical application.

The specific implementation process of the above Mode I in practical application is as shown in FIG. 4:

Step 401: the terminal is powered on, and determines an optimal downlink receive beam (Rx beam) and a transmitting beam (Tx beam) according to the synchronization signal of the base station.

It should be noted that, when the UE is powered on, the UE synchronizes with the network side by searching for signals such as PSS (primary synchronization signal) and SSS (secondary synchronization signal). During the synchronization, the base station transmits synchronization signals through multiple beams, and the UE utilizes multiple panels respectively perform the beam search of the synchronization signals, that is, the analog beams on each panel performs the reception in a spatial direction in turn, to find the optimal downlink Rx beam and Tx beam of the panel.

Step 402: the terminal performs random access, and carries the first type of attribute information and the optimal downlink Tx beam corresponding to each panel in the uplink channel in the random access.

It should be noted that the uplink channel may be a RACH (Random Access Channel). In this way, the base station may learn information of the panel information of the antenna structure of the UE, the supported beam information, and the optimal downlink Tx beam.

Step 403: after establishing a radio resource control (RRC) connection, the terminal reports the second type of attribute information.

It is to be noted that, according to the first type of attribute information of the UE, the base station sends the subsequent random access downlink information through the optimal Tx beam of each panel, and the UE receives the downlink information through the optimal Rx beam of the panel. In this way, the random access is completed, the RRC connection is established, and then the second type of attribute information of the UE is reported.

It should be noted that, when performing data transmission, the base station uses the optimal downlink Tx beam of each panel of the UE to carry the downlink channel, and the UE uses each panel optimal downlink Rx beam to receive the data. Here, the beam used for data transmission for each polarization direction array of each panel may be different. Moreover, if each panel supports different frequencies, it is needed to use the respective frequencies to send the data on the beam. For example, if the UE has 2 panels and the array on each panel has only one polarization direction, the base station may use the spatial multiplexing technology to send 2 parallel data streams, and each data stream is carried by the optimal beam corresponding to each panel, or the 2-way data stream is pre-coded and then carried by the optimal beam corresponding to each panel, and then the UE uses two panels to receive the two data streams respectively.

Mode II

After Step 301, the method for reporting terminal information in some embodiments of the present disclosure further includes:

in the random access procedure or subsequent to the random access procedure, determining optimal downlink transmitting beam information measured on each panel by the terminal, based on a receiving strength of a matching beam sent by the base station based on the setting parameter.

It should be noted that, since the terminal has already transmitted the setting parameters of its own antenna structure, the base station can transmit beams based on the setting manner of the antenna structure of the terminal, and the terminal also receives in the same manner.

transmitting the optimal downlink transmitting beam information measured on each panel by the terminal to the base station.

Because the terminal first reports the first type of attribute information, after obtaining the optimal downlink transmission beam information, the optimal downlink transmission beam information may be reported in the random access procedure, or the optimal downlink transmission beam information may be reported after the random access procedure. It should be noted that, when the optimal downlink transmission beam information is reported after the random access, the terminal may report the optimal downlink transmission beam information together with the second type of attribute information, or may report the optimal downlink transmitting beam information independently.

Figure 5:
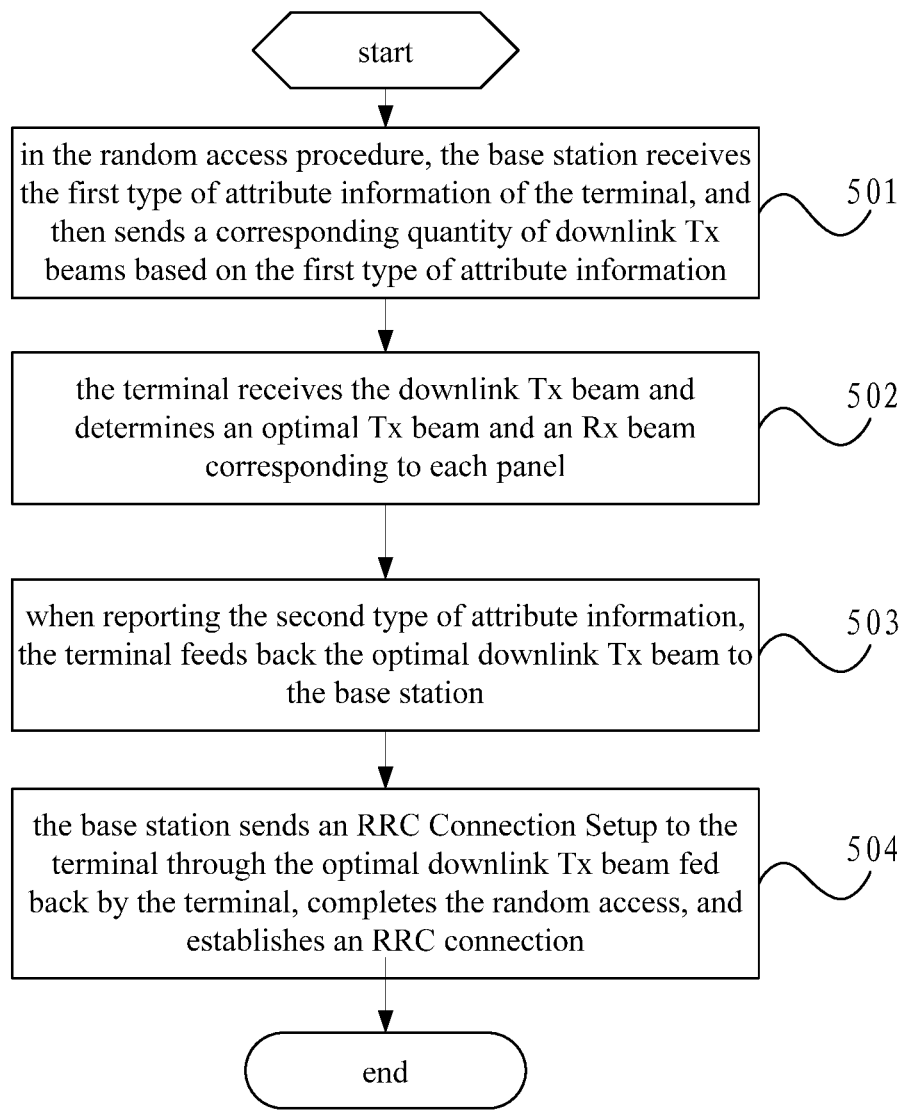
FIG. 5 is a schematic view showing a specific implementation process of Mode II in practical applications.

The specific implementation process of the above Mode 2 in practical application is as shown in FIG. 5:

Step 501: in the random access procedure, the base station receives the first type of attribute information of the terminal, and then sends a corresponding quantity of downlink Tx beams based on the first type of attribute information.

It should be noted that, when the base station is in the random access procedure, the RA preamble of the UE is first received, which includes the first type of attribute information of the UE, and then, when the RA response message is transmitted, a corresponding quantity of downlink Tx beams are transmitted based on the quantity of beams supported by the panel of the UE.

Step 502: the terminal receives the downlink Tx beam and determines an optimal Tx beam and an Rx beam corresponding to each panel.

It should be noted that the terminal performs the reception in the spatial direction in turn through the analog beams on the plurality of panels, to searches for the optimal downlink Tx beam and Rx beam corresponding to each panel.

Step 503: when reporting the second type of attribute information, the terminal feeds back the optimal downlink Tx beam to the base station.

It should be noted that the second type of attribute information of the UE is reported by the UE when the RRC Connection Request is sent.

Step 504: the base station sends an RRC Connection Setup to the terminal through the optimal downlink Tx beam fed back by the terminal, completes the random access, and establishes an RRC connection.

It should be noted that, when performing data transmission, the base station uses the optimal downlink Tx beam of each panel of the UE to carry the downlink channel, and the UE uses each panel optimal downlink Rx beam to receive the data. Here, the beam used for data transmission for each polarization direction array of each panel may be different. Moreover, if each panel supports different frequencies, it is needed to use the respective frequencies to send the data on the beam. For example, if the UE has 2 panels and the array on each panel has only one polarization direction, the base station may use the spatial multiplexing technology to send 2 parallel data streams, and each data stream is carried by the optimal beam corresponding to each panel, or the 2-way data stream is pre-coded and then carried by the optimal beam corresponding to each panel, and then the UE uses two panels to receive the two data streams respectively.

It should be noted that, in order to facilitate the base station to distinguish the optimal downlink transmission beam, the optimal downlink transmission beam information sent by the terminal to the base station needs to include: identifier information (e.g., ID) of the panel that measures an optimal downlink transmission beam and identifier information (e.g., ID) of the optimal downlink transmission beam.

According to the embodiments of the present disclosure, in the random access, the setting parameter of the antenna structure of the terminal is sent to the base station, so the subsequent information transmission procedure may not be affected, and the network side is able to provide a more efficient beam management, more precise beam alignment, more optimized multi-user scheduling and multi-data flow transmission to the system when using more antennas for user scheduling and data transmission based on the structure information of the antenna array.

Figure 6:
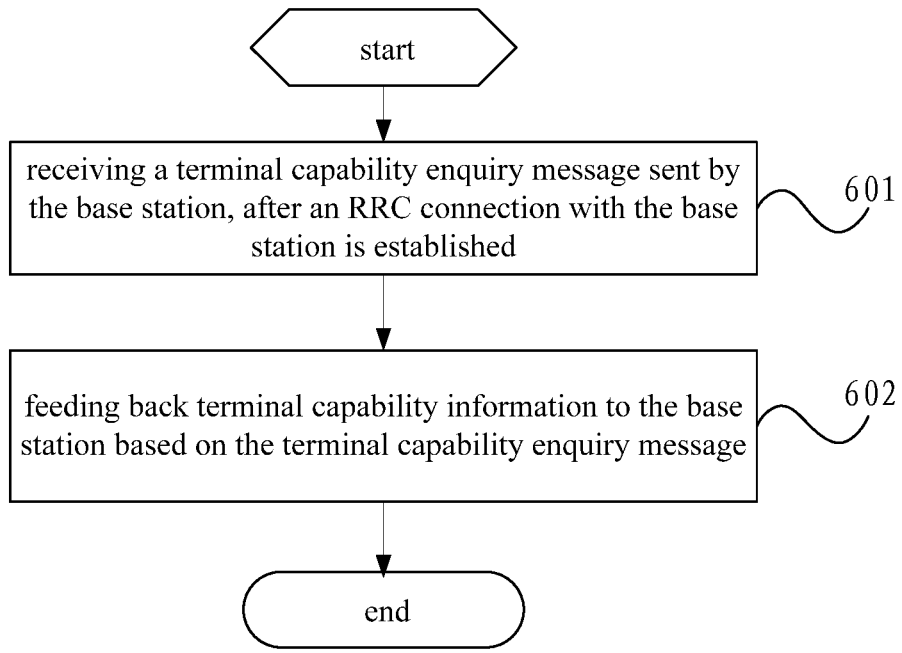
FIG. 6 is a flowchart of a method for reporting terminal information in some embodiments of the present disclosure.

FIG. 6 is a flowchart of a method for reporting terminal information in some embodiments of the present disclosure. The implementation process of the method for reporting terminal information will be specifically described below in conjunction with FIG. 6.

A method for reporting terminal information is further provided in some embodiments of the present disclosure, applied to a terminal and including:

Step 601: receiving a terminal capability enquiry message sent by the base station, after an RRC connection with the base station is established.

It should be noted that, after the base station establishes an RRC connection with the terminal, the base station needs to know the capability information of the terminal. At this time, the base station needs to send a terminal capability enquiry message to the terminal.

Step 602: feeding back terminal capability information to the base station based on the terminal capability enquiry message, where the terminal capability information includes a first type of attribute information and a second type of attribute information of the terminal or the terminal capability information includes a first type of attribute information of the terminal, where the first type of attribute information includes the setting parameter of the antenna structure of the terminal.

It should be noted that there are two types of capability information to feedback at the terminal side, that is, the first type of attribute information (refers to the setting parameters of the terminal antenna structure) and the second type of attribute information (has the same parameters with the UE EUTRA capability mentioned in the background art). When transmitting the two type of capability information, the terminal may send the two types of capability information to the base station together, or respectively.

In some embodiments of the present disclosure, the setting parameter of the antenna structure of the terminal is sent to the base station after the RRC connection is established, and then the base station sends all the capability information of the terminal to the MME.

It should be noted that, the baseband parameter includes: a quantity of transceiver units supported by the terminal; the radio frequency parameter includes one or more of: a quantity of panels, frequency information supported by each panel, a quantity of beams supported by each panel, and a quantity of antenna array polarization directions of each panel. The feedback message may be a random access preamble message (RA Preamble) or a radio resource control (RRC) connection request message.

It should be noted that the setting parameters of the newly added terminal antenna structure in some embodiments of the present disclosure may be implemented by adding an information element (IE) in the UE EUTRA capability, or may be implemented by adding a parameter option in the UE Category.

It should be noted that the new added IE may be a new IE, including but not limited to, for example, UE antenna structure information, and the following parameters may be included in the IE: number of baseband units, number of panel, number of array polarization direction in a panel, number of beams in a panel, or the like, or the above parameters may be set in one IE.

It should also be noted that the new parameters in the UE Category may include the various parameters listed above.

In order to enable the base station to transmit the downlink data better, the terminal needs to report the optimal downlink transmission beam to the base station. In some embodiments of the present disclosure, Mode 3 is used to perform the reporting of the optimal downlink transmission beam.

Mode III

After Step 602, the method for reporting terminal information in some embodiments of the present disclosure further includes:

determining optimal downlink transmitting beam information measured on each panel by the terminal, based on a receiving strength of a matching beam sent by the base station based on the setting parameter.

It should be noted that, since the terminal has already transmitted the setting parameters of its own antenna structure, the base station is able to transmit beams according to the setting manner of the antenna structure of the terminal when transmitting the beam, and the terminal also receives the beams in the same manner.

transmitting the optimal downlink transmitting beam information measured on each panel by the terminal to the base station.

It should be noted that, since the terminal has reported the capability information to the base station, it is only necessary to provide the measured optimal downlink transmission beam information to the base station, and at the same time, in order to facilitate the base station to distinguish the optimal downlink transmission beam, the optimal downlink transmitting beam information sent by the terminal to the base station needs to include: identifier information of the panel where the optimal downlink transmission beam is measured and identifier information of the optimal downlink transmission beam.

Figure 7:
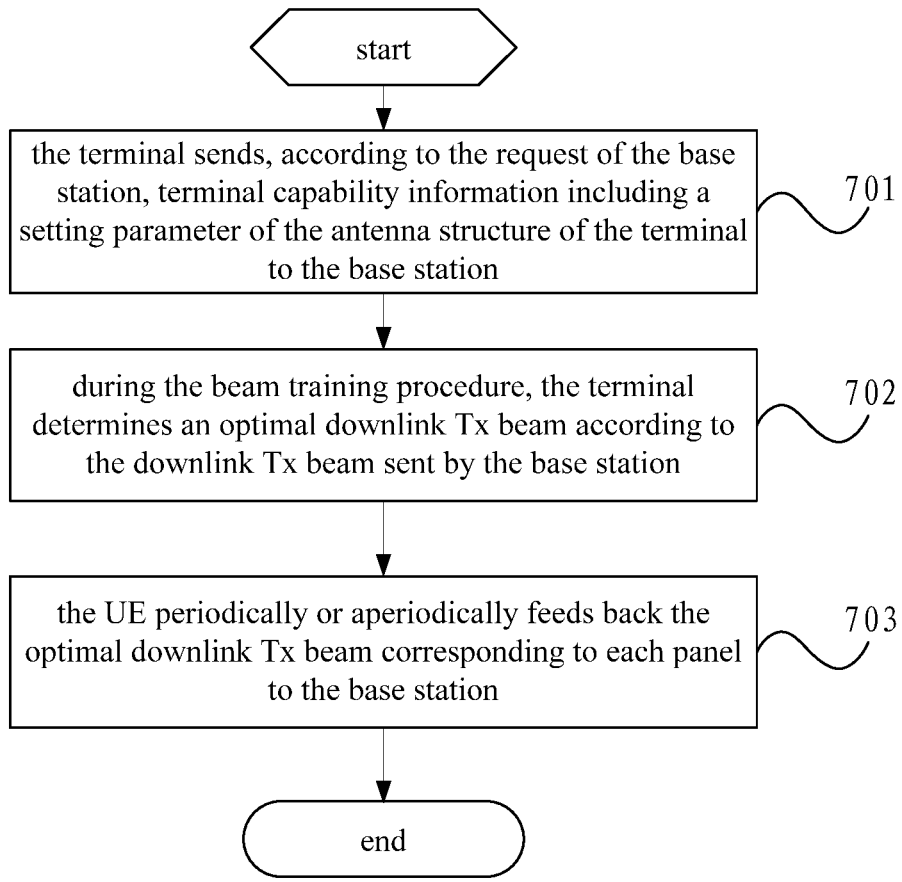
FIG. 7 is a schematic view showing a specific implementation process of Mode III in practical applications.

The specific implementation process of the above Mode 3 in practical application is shown in FIG. 7:

Step 701: the terminal sends, according to the request of the base station, terminal capability information including a setting parameter of the antenna structure of the terminal to the base station.

It should be noted that, in this step, according to the UE capability reporting manner in the protocol in the related art, after the random access, the base station sends the UE Capability Enquiry to the UE, and then the UE sends the UE Capability Information to the base station, and the UE capability information is reported to the base station, where the UE capability information includes setting parameters of the antenna structure of the terminal.

Step 702: in the beam training procedure, the terminal determines an optimal downlink Tx beam according to the downlink Tx beam sent by the base station.

Figure 8:
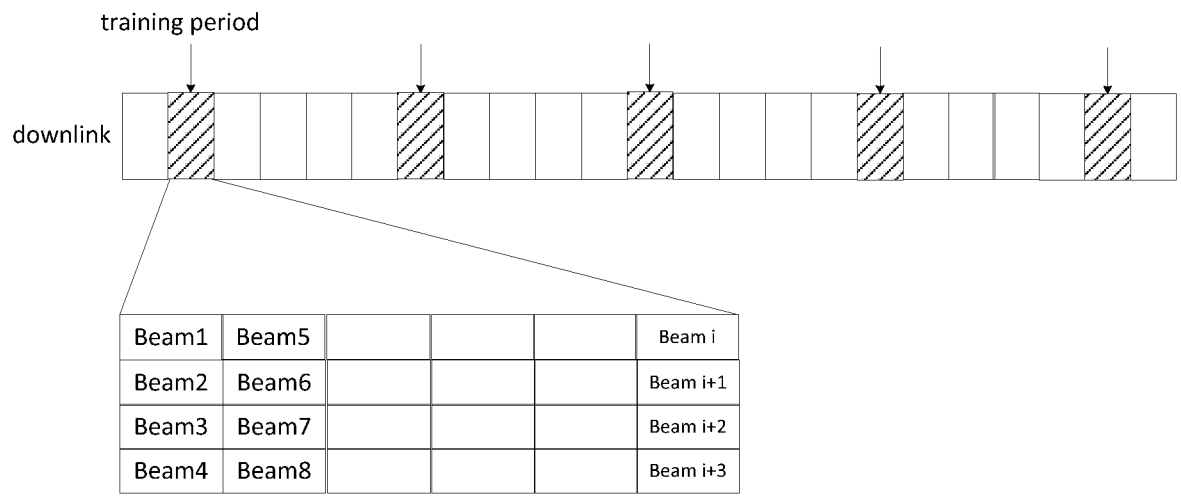
FIG. 8 is a schematic view showing a transmission structure of a beam.

It should be noted that the base station sends a matching quantity of training beams according to information such as the quantity of panels and the quantity of beams supported by the UE capability. The base station's beam training can be periodic or triggered. When the beam training is required (i.e., the training time is reached, or a trigger event occurs), if the UE has 2 panels, each panel supports up to 4 beams. Then, the base station transmits the downlink Tx beam in groups of four, and simultaneously transmits the group of Tx beams at the same frequency, and each panel of the UE searches for the group of downlink Tx beams through the supported four beams in turn. The specific beam transmission structure is as shown in FIG. 8; then, the base station replaces another group of 4 Tx beams and simultaneously transmits the same to the UE, and each panel of the UE searches again. Finally, the UE compares the search results in each of the downlink Tx beam groups to obtain the optimal Tx beam and Rx beam for each panel. The optimal beam for each panel may be the same or different.

Figure 9:
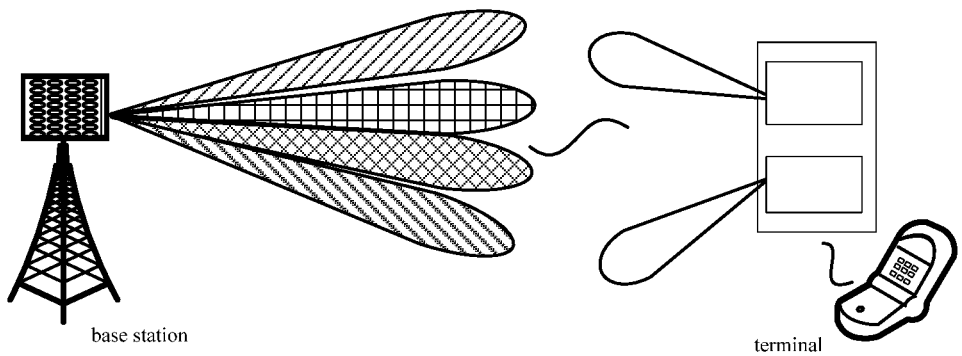
FIG. 9 is a schematic view showing a transmission state of a base station beam.

As shown in FIG. 9, the beam transmitting of the base station beam is as follows: assuming that the UE has two panels, each panel supports four beams (the beam is distinguished by different padding in the figure), and the base station sends 4 beams at each beam training time. Each panel of the UE performs an optimal beam search.

Step 703: the UE periodically or aperiodically feeds back the optimal downlink Tx beam corresponding to each panel to the base station.

It should be noted that the terminal also needs to maintain an optimal beam set, where the set includes the optimal downlink Tx beam and Rx beam of each panel.

Then, the base station carries the data to the optimal downlink Tx beam corresponding to each panel when the control channel or the data channel is transmitted in the optimal downlink Tx beam.

It should be noted that, since the quantity of beams and frequencies supported by each panel of the UE may be different, for example, a high frequency panel and a low frequency panel, the network side needs to perform a specific number of beam or data stream transmission for each panel of the UE, to achieve a beam alignment or multi-layer data transmission. On the other hand, the same for the uplink, that is, the UE sends a specific quantity of beams or data streams to the network side through a message about parameters of the new antenna structure, and the network side receives an uplink signal or channel using a specific quantity of beams according to information such as the quantity of panels of the UE and the quantity of beams supported by the panel.

It should also be noted that in a large-scale antenna array structure, the TxRU of the UE is usually not omnidirectional. For example, for high frequency carriers, each panel may be connected to a TxRU for each polarization direction. At this point, the UE can support multiple transmit/receive beams at the same time, but not from the same panel, except for two polarized beams. When the UE capability exceeds the protocol version of the currently accessed network (for example, the UE of Release 14 accesses Release 13), the UE capability degradation processing may be supported, that is, the UE capability of the corresponding protocol version is used according to the capabilities of the network, while more advanced UE capabilities are not used.

According to the embodiments of the present disclosure, when the base station needs the terminal capability information after the RRC connection is established, the terminal sends the setting parameter of the antenna structure of the terminal to the base station, so that the terminal may transmit the setting parameters of the antenna structure of the terminal in a targeted way, and the invalid transmission of information is avoided. At the same time, the network side may provide a more efficient beam management, more precise beam alignment, more optimized multi-user scheduling and multi-data flow transmission to the system when using more antennas for user scheduling and data transmission.

Figure 10:
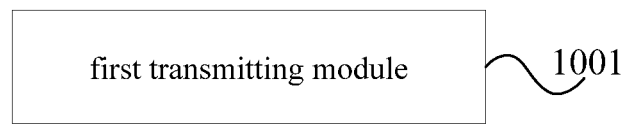
FIG. 10 is a first schematic view of a terminal in some embodiments of the present disclosure.
Figure 11:
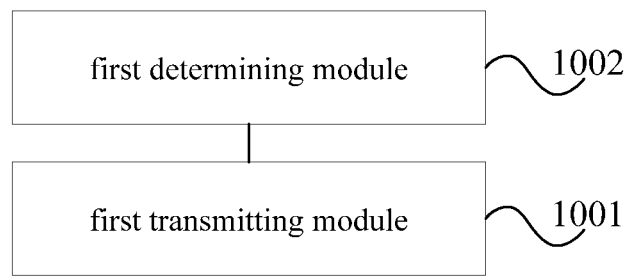
FIG. 11 is a second schematic view of a terminal in some embodiments of the present disclosure.
Figure 12:
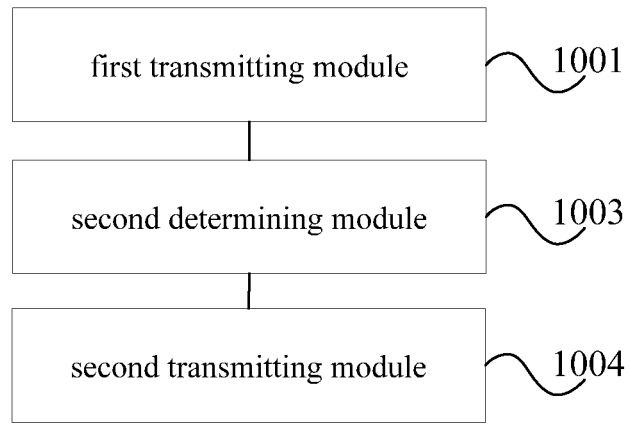
FIG. 12 is a third schematic view of a terminal in some embodiments of the present disclosure.
Figure 13:
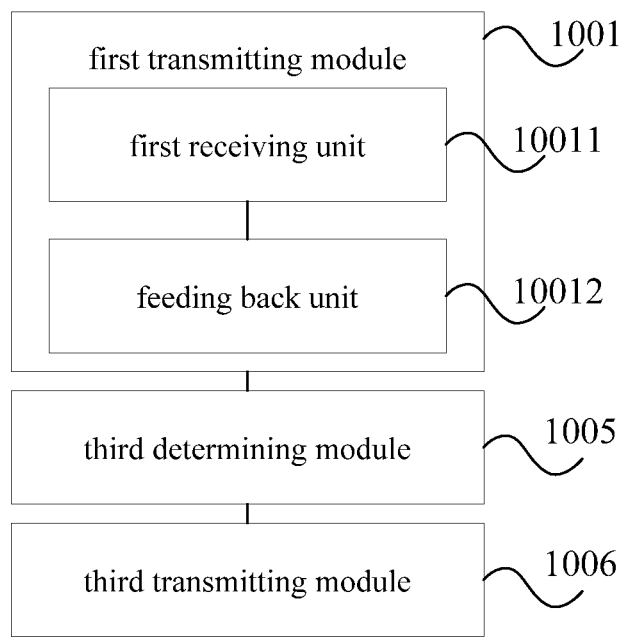
FIG. 13 is a fourth schematic view of a terminal in some embodiments of the present disclosure.

As shown in FIG. 10 which is a first schematic view of a terminal in some embodiments of the present disclosure, and a terminal based on the method for reporting terminal information will be specifically described below with reference to FIG. 11 to FIG. 13.

A terminal is further provided in some embodiments of the present disclosure, including:

a first transmitting module 1001, configured to transmit a setting parameter of an antenna structure of a terminal to a base station, where the setting parameter includes a baseband parameter and/or a radio frequency parameter;

the baseband parameter includes: a quantity of transceiver units supported by the terminal;

the radio frequency parameter includes one or more of: a quantity of panels, frequency information supported by each panel, a quantity of beams supported by each panel, and a quantity of antenna array polarization directions of each panel.

Optionally, the first transmitting module 1001 is configured to:

transmit, in a random access procedure, a feedback message including a first type of attribute information of the terminal to the base station, where the first type of attribute information of the terminal includes the setting parameter of the antenna structure of the terminal.

Specifically, the feedback message is a random access preamble message or a radio resource control (RRC) connection request message.

Optionally, the terminal further includes:

a first determining module 1002, configured to, prior to the random access procedure, determine optimal downlink transmitting beam information measured on each panel, based on a receiving strength of a synchronization signal sent by the base station;

where the first transmitting module 1001 is configured to:

transmit, in the random access procedure, the feedback message including the first type of attribute information of the terminal and the optimal downlink transmitting beam information measured on each panel to the base station.

Optionally, the terminal further includes:

a second determining module 1003, configured to, in the random access procedure or subsequent to the random access procedure, determine optimal downlink transmitting beam information measured on each panel, based on a receiving strength of a matching beam sent by the base station based on the setting parameter;

a second transmitting module 1004, configured to transmit the optimal downlink transmitting beam information measured on each panel to the base station.

Optionally, the first transmitting module includes:

a first receiving unit 10011, configured to receive a terminal capability enquiry message sent by the base station, after an RRC connection with the base station is established;

a feeding back unit 10012, configured to feed back terminal capability information to the base station based on the terminal capability enquiry message, where the terminal capability information includes a first type of attribute information and a second type of attribute information of the terminal or the terminal capability information includes a first type of attribute information of the terminal, where the first type of attribute information includes the setting parameter of the antenna structure of the terminal, and the second type of attribute information is the evolved universal mobile communication system UMTS terrestrial radio access capability information.

Optionally, the terminal further includes:

a third determining module 1005, configured to determine optimal downlink transmitting beam information measured on each panel, based on a receiving strength of a matching beam sent by the base station based on the setting parameter;

a third transmitting module 1006, configured to transmit the optimal downlink transmitting beam information measured on each panel to the base station.

Specifically, the optimal downlink transmission beam information includes: identifier information of the panel where the optimal downlink transmission beam is measured and identifier information of the optimal downlink transmission beam.

According to the terminal in some embodiments of the present disclosure, the first transmitting module 1001 sends the setting parameter of its own antenna structure to the base station, so that the network side knows the antenna array structure information of the terminal, and then in the subsequent use, the network side is able to provide a more efficient beam management, more precise beam alignment, more optimized multi-user scheduling and multi-data flow transmission to the system when using more antennas for user scheduling and data transmission.

Figure 14:
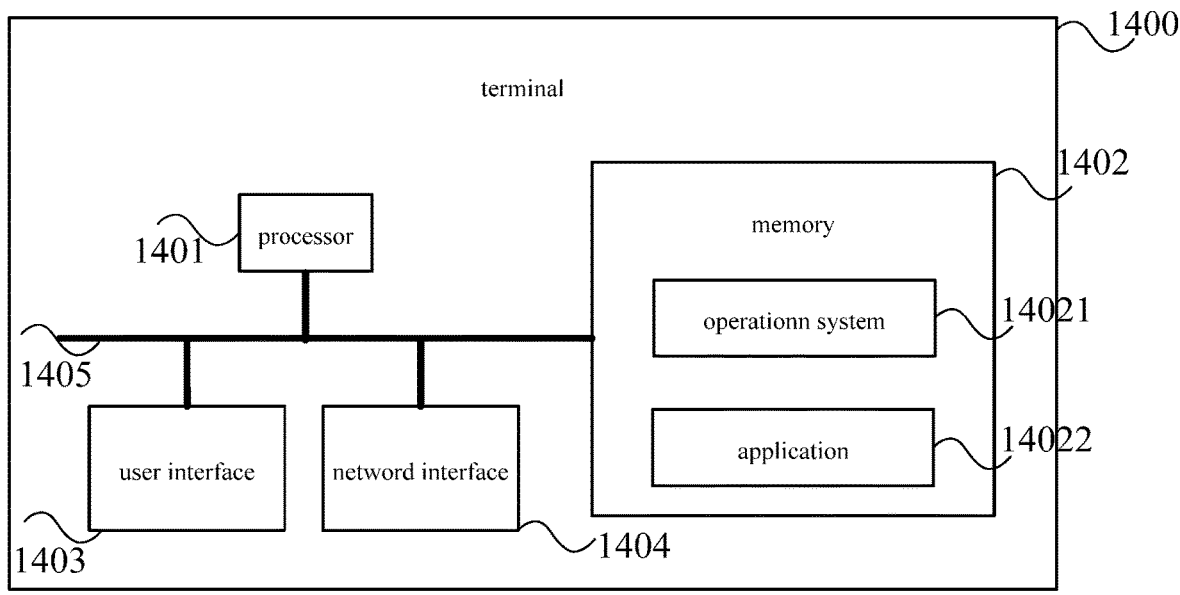
FIG. 14 is a structural block diagram of a terminal in some embodiments of the present disclosure.

FIG. 14 which is a structural block diagram of a terminal in some embodiments of the present disclosure. The terminal for reporting terminal information in the present disclosure will be described in conjunction with FIG. 14 in the following.

The terminal 1400 shown in FIG. 14 includes at least one processor 1401, a memory 1402, at least one network interface 1404, and a user interface 1403. The various components in terminal 1400 are coupled together by a bus system 1405. It will be appreciated that the bus system 1405 is used to implement connection communication between these components. The bus system 1405 includes a power bus, a control bus, and a status signal bus in addition to the data bus. However, for clarity of description, various buses are labeled as bus system 1405 in FIG. 14.

The user interface 1403 may include a display, a keyboard, or a pointing device (e.g., a mouse, a track ball, a touch pad, or a touch screen, etc.).

It is to be understood that the memory 1402 in an embodiment of the present disclosure may be a volatile memory or a non-volatile memory, or may include both volatile and non-volatile memory. The non-volatile memory may be a read-only memory (ROM), a programmable read only memory (PROM), an erasable programmable read only memory (Erasable PROM, EPROM), or an electric Erase programmable read only memory (EEPROM) or flash memory. The volatile memory may be a Random Access Memory (RAM) that acts as an external cache. By way of example and not limitation, many forms of RAM are available, such as static random access memory (SRAM), dynamic random access memory (DRAM), synchronous dynamic random access memory (Synchronous DRAM). SDRAM), Double Data Rate Synchronous Dynamic Random Access Memory (DDRSDRAM), Enhanced Synchronous Dynamic Random Access Memory (ESDRAM), Synchronous Connection Dynamic Random Access Memory (SDRAM) and direct memory bus random access memory (DRRAM). The memory 1402 of the systems and methods described herein is intended to comprise, without being limited to, these and any other suitable types of memory.

In some implementations, the memory 1402 stores elements, executable modules or data structures, or a subset thereof, or their extended set: an operating system 14021 and an application 14022.

The operating system 14021 includes various system programs, such as a framework layer, a core library layer, a driver layer, and the like, for implementing various basic services and processing hardware-based tasks. The application 14022 includes various applications, such as a media player (Media Player), a browser, and the like, for implementing various application services. A program implementing the method of the embodiment of the present disclosure may be included in the application 14022.

In some embodiments of the present disclosure, by calling a program or instruction stored in the memory 1402, specifically a program or instruction stored in the application 14022, the processor 1401 is configured to control the transmitting of setting parameters of the antenna structure of the terminal to the base station. The setting parameters include baseband parameters and/or radio frequency parameters.

The baseband parameter includes: a quantity of transceiver units supported by the terminal;

The radio frequency parameter includes one or more of: a quantity of panels, frequency information supported by each panel, a quantity of beams supported by each panel, and a quantity of antenna array polarization directions of each panel.

The method disclosed in some embodiments of the present disclosure described above may be applied to the processor 1401 or implemented by the processor 1401. The processor 1401 may be an integrated circuit chip with signal processing capabilities. In the implementation process, each step of the foregoing method may be completed by an integrated logic circuit of hardware in the processor 1401 or an instruction in a form of software. The processor 1401 may be a general-purpose processor, a digital signal processor (DSP), an application specific integrated circuit (ASIC), a field programmable gate array (FPGA), or the like. or other programmable logic devices, discrete gates or transistor logic devices, discrete hardware components. The methods, steps, and logical block diagrams disclosed in some embodiments of the present disclosure may be implemented or carried out. The general purpose processor may be a microprocessor or the processor or any conventional processor or the like. The steps of the method disclosed in connection with some embodiments of the present disclosure may be directly embodied by the hardware decoding processor, or by a combination of hardware and software modules in the decoding processor. The software module can be located in a conventional storage medium such as random access memory, flash memory, read only memory, programmable read only memory or electrically erasable programmable memory, registers, and the like. The storage medium is located in the memory 1402, and the processor 1401 reads the information in the memory 1402 and performs the steps of the above method in combination with its hardware.

It will be appreciated that the embodiments described herein can be implemented in hardware, software, firmware, middleware, microcode, or a combination thereof. For hardware implementation, the processing unit can be implemented in one or more application specific integrated circuits (ASICs), digital signal processing (DSP), digital signal processing equipment (DSP Device, DSPD), programmable logic Programmable Logic Device (PLD), Field-Programmable Gate Array (FPGA), general purpose processor, controller, microcontroller, microprocessor, other electronics for performing the functions described herein Unit or combination thereof.

For a software implementation, the techniques described herein can be implemented by modules (e.g., procedures, functions, and so on) that perform the functions described herein. The software code can be stored in memory and executed by the processor. The memory can be implemented in the processor or external to the processor.

Optionally, the processor 1401 is configured to control to transmit, in a random access procedure, a feedback message including a first type of attribute information of the terminal to the base station, where the first type of attribute information of the terminal includes the setting parameter of the antenna structure of the terminal.

Optionally, the processor 1401 is further configured to: prior to the random access procedure, determining optimal downlink transmitting beam information measured on each panel, based on a receiving strength of a synchronization signal sent by the base station; transmitting, in the random access procedure, the feedback message including the first type of attribute information of the terminal and the optimal downlink transmitting beam information measured on each panel to the base station.

Optionally, the processor 1401 is further configured to: in the random access procedure or subsequent to the random access procedure, determine optimal downlink transmitting beam information measured on each panel, based on a receiving strength of a matching beam sent by the base station based on the setting parameter; transmit the optimal downlink transmitting beam information measured on each panel to the base station.

Optionally, the processor 1401 is further configured to: receive a terminal capability enquiry message sent by the base station, after an RRC connection with the base station is established; feed back terminal capability information to the base station based on the terminal capability enquiry message, where the terminal capability information includes a first type of attribute information and a second type of attribute information of the terminal or the terminal capability information includes a first type of attribute information of the terminal, where the first type of attribute information includes the setting parameter of the antenna structure of the terminal, and the second type of attribute information is evolved universal mobile telecommunications system (UMTS) terrestrial radio access capability information.

Optionally, the processor 1401 is further configured to: determine optimal downlink transmitting beam information measured on each panel, based on a receiving strength of a matching beam sent by the base station based on the setting parameter; transmit the optimal downlink transmitting beam information measured on each panel to the base station.

The optimal downlink transmission beam information includes: identifier information of the panel where the optimal downlink transmission beam is measured and identifier information of the optimal downlink transmission beam.

The terminal 1400 can implement various processes implemented by the terminal in the foregoing embodiment. To avoid repetition, details are not described herein again.

According to the terminal in some embodiments of the present disclosure controls, the processor 1401 controls to transmit the setting parameters of the antenna structure of the terminal to the base station, where the setting parameter includes a baseband parameter and/or a radio frequency parameter. Therefore, the network side may know the antenna array structure information of the terminal, and then in the subsequent use, the network side is able to provide a more efficient beam management, more precise beam alignment, more optimized multi-user scheduling and multi-data flow transmission to the system when using more antennas for user scheduling and data transmission.

Figure 15:
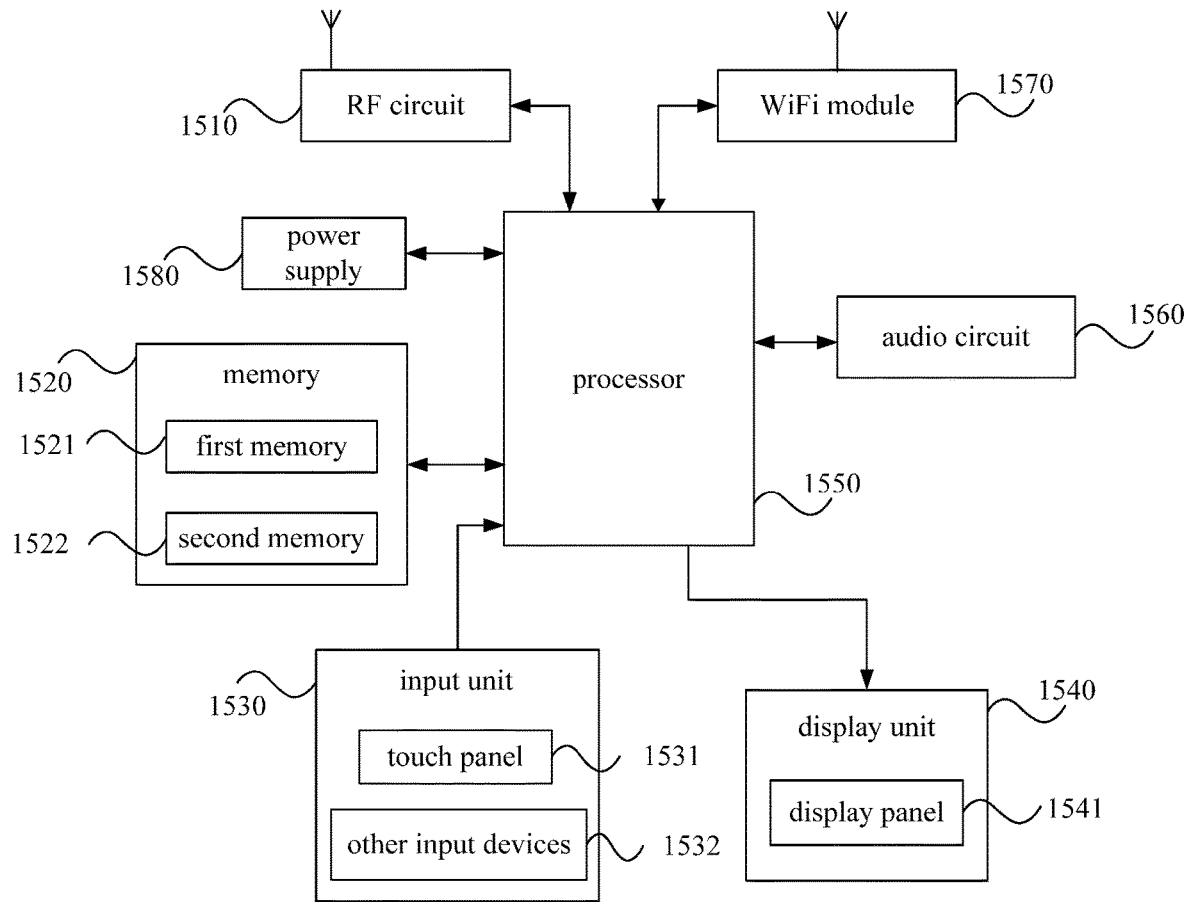
FIG. 15 is a schematic view of a terminal in some embodiments of the present disclosure.

FIG. 15 is a schematic view of a terminal in some embodiments of the present disclosure. Specifically, the terminal in FIG. 15 may be a mobile phone, a tablet computer, a personal digital assistant (PDA), or a car computer.

The terminal in FIG. 15 includes a radio frequency (RF) circuit 1515, a memory 1520, an input unit 1530, a display unit 1540, a processor 1550, an audio circuit 1560, a WiFi (Wireless Fidelity) module 1570, and a power supply 1580.

The input unit 1530 may be configured to receive numeric or character information input by the user, and generate signal input related to user settings and function control of the terminal. Specifically, in some embodiments of the present disclosure, the input unit 1530 may include a touch panel 1531. The touch panel 1531, also referred to as a touch screen, can collect touch operations of user there on or nearby (such as the operation of the user using any suitable object or accessory such as a finger or a stylus on the touch panel 1531), and drive the corresponding connection device according to the preset program. Optionally, the touch panel 1531 may include two parts: a touch detection device and a touch controller. The touch detection device detects the touch orientation of the user, and detects a signal brought by the touch operation, and transmits the signal to the touch controller; the touch controller receives the touch information from the touch detection device, converts the touch information into contact coordinates, and sends the touch information to the processor 1550 and can receive commands from the processor 1550 and execute them. In addition, the touch panel 1531 can be implemented in various types such as resistive, capacitive, infrared, and surface acoustic waves. In addition to the touch panel 1531, the input unit 1530 may further include other input devices 1532. The other input devices 1532 may include, but are not limited to, one or more of a physical keyboard, function keys (such as volume control buttons, switch buttons, etc.), trackballs, mice, joysticks, and the like.

The display unit 1540 can be used to display information input by the user or information provided to the user and various menu interfaces of the terminal. The display unit 1540 can include a display panel 1541. Alternatively, the display panel 1541 can be configured in the form of an LCD or an Organic Light-Emitting Diode (OLED).

It should be noted that the touch panel 1531 may cover the display panel 1541 to form a touch display screen, and when the touch display screen detects a touch operation on or near it, it is transmitted to the processor 1550 to determine the type of the touch event, and then the processor 1550 provides a corresponding visual output on the touch display depending on the type of touch event.

The touch display includes an application interface display area and a common control display area. The arrangement manner of the application interface display area and the display area of the common control is not limited, and the arrangement manner of the two display areas can be distinguished by up-and-down arrangement, left-right arrangement, and the like. The application interface display area can be used to display the interface of the application. Each interface can contain interface elements such as at least one application's icon and/or widget desktop control. The application interface display area can also be an empty interface that does not contain any content. The common control display area is used to display controls with high usage, such as setting buttons, interface numbers, scroll bars, phone book icons, and the like.

The processor 1550 is a control center of the terminal, and connects various parts of the entire mobile phone through various interfaces and lines, by running or executing software programs and/or modules stored in the first memory 1521, and calling and storing in the second memory 1522. The internal data, performing various functions of the terminal and processing data, thereby performing overall monitoring of the terminal. Optionally, the processor 1550 may include one or more processing units.

In some embodiments of the present disclosure, the processor 1550 is configured to control to transmit the setting parameters of the antenna structure of the terminal to the base station by calling a software program and/or module stored in the first memory 1521 and/or data in the second memory 1522, where the setting parameters include baseband parameters and/or radio frequency parameters.

Further, the baseband parameter includes: a quantity of transceiver units supported by the terminal; the radio frequency parameter includes one or more of: a quantity of panels, frequency information supported by each panel, a quantity of beams supported by each panel, and a quantity of antenna array polarization directions of each panel.

Optionally, the processor 1550 is further configured to control to transmit, in a random access procedure, a feedback message including a first type of attribute information of the terminal to the base station, where the first type of attribute information of the terminal includes the setting parameter of the antenna structure of the terminal.

The feedback message is a random access preamble message or a radio resource control (RRC) connection request message.

Optionally, the processor 1550 is further configured to: prior to the random access procedure, determine optimal downlink transmitting beam information measured on each panel, based on a receiving strength of a synchronization signal sent by the base station, and transmit, in the random access procedure, the feedback message including the first type of attribute information of the terminal and the optimal downlink transmitting beam information measured on each panel to the base station.

Optionally, the processor 1550 is further configured to: in the random access procedure or subsequent to the random access procedure, determine optimal downlink transmitting beam information measured on each panel, based on a receiving strength of a matching beam sent by the base station based on the setting parameter; transmit the optimal downlink transmitting beam information measured on each panel to the base station.

Optionally, the processor 1550 is further configured to: receive a terminal capability enquiry message sent by the base station, after an RRC connection with the base station is established; feed back terminal capability information to the base station based on the terminal capability enquiry message, where the terminal capability information includes a first type of attribute information and a second type of attribute information of the terminal or the terminal capability information includes a first type of attribute information of the terminal, where the first type of attribute information includes the setting parameter of the antenna structure of the terminal, and the second type of attribute information is evolved universal mobile telecommunications system (UMTS) terrestrial radio access capability information.

Optionally, the processor 1550 is further configured to: determine optimal downlink transmitting beam information measured on each panel, based on a receiving strength of a matching beam sent by the base station based on the setting parameter; transmit the optimal downlink transmitting beam information measured on each panel to the base station.

The optimal downlink transmission beam information includes: identifier information of the panel where the optimal downlink transmission beam is measured and identifier information of the optimal downlink transmission beam.

The terminal of some embodiments of the present disclosure can implement various processes implemented by the terminal in the foregoing embodiment. To avoid repetition, details are not described herein again.

According to the terminal in some embodiments of the present disclosure controls, the processor 1550 controls to transmit the setting parameters of the antenna structure of the terminal to the base station, where the setting parameter includes a baseband parameter and/or a radio frequency parameter. Therefore, the network side may know the antenna array structure information of the terminal, and then in the subsequent use, the network side is able to provide a more efficient beam management, more precise beam alignment, more optimized multi-user scheduling and multi-data flow transmission to the system when using more antennas for user scheduling and data transmission.

The various embodiments in the present specification are described in a progressive manner, and each embodiment focuses on differences from other embodiments, and the same similar parts between the various embodiments can be referred to each other.

It should be appreciated that, the present disclosure may be provided as a method, a system or a computer program product, so the present disclosure may be in the form of full hardware embodiments, full software embodiments, or combinations thereof. In addition, the present disclosure may be in the form of a computer program product implemented on one or more computer-readable storage mediums (including but not limited to disk memory, CD-ROM and optical memory) including computer-readable program codes.

The present disclosure has been described with reference to the flow charts and/or block diagrams of the method, device (system) and computer program product according to the embodiments of the present disclosure. It should be understood that computer program instructions may be used to implement each of the work flows and/or blocks in the flow charts and/or the block diagrams, and the combination of the work flows and/or blocks in the flow charts and/or the block diagrams. These computer program instructions may be provided to a processor of a common computer, a dedicate computer, an embedded processor or any other programmable data processing devices to create a machine, so that instructions executable by the processor of the computer or the other programmable data processing devices may create a device to achieve the functions assigned in one or more work flows in the flow chart and/or one or more blocks in the block diagram.

These computer program instructions may also be stored in a computer readable storage that may guide the computer or the other programmable data process devices to function in a certain way, so that the instructions stored in the computer readable storage may create a product including an instruction unit which achieves the functions assigned in one or more flows in the flow chart and/or one or more blocks in the block diagram.

These computer program instructions may also be loaded in the computer or the other programmable data process devices, so that a series of operation steps are executed on the computer or the other programmable devices to create processes achieved by the computer. Therefore, the instructions executed in the computer or the other programmable devices provide the steps for achieving the function assigned in one or more flows in the flow chart and/or one or more blocks in the block diagram.

Although the embodiments are described above, a person skilled in the art may make modifications and alterations to these embodiments in accordance with the basic concept of the present disclosure. Therefore, the attached claims are intended to include the preferred embodiments and all of the modifications and alterations that fall within the scope of the present disclosure. Therefore, the appended claims are intended to be interpreted as including the alterations and the modifications.

It should also be noted that, in this context, relational terms such as first and second, etc. are used merely to distinguish one entity or operation from another entity or operation, without necessarily requiring or implying such entities or operations. There is any such actual relationship or order between them. Furthermore, the terms "comprises" or "comprising" or "comprising" or any other variations are intended to encompass a non-exclusive inclusion, such that a process, method, article, or terminal device that includes a plurality of elements includes not only those elements but also other elements that are included, or include elements inherent to such a process, method, article, or terminal device. An element defined by the phrase "comprising a . . . " does not exclude the presence of additional identical elements in the process, method, article, or terminal device that comprises the element, without further limitation.

Figure 16:
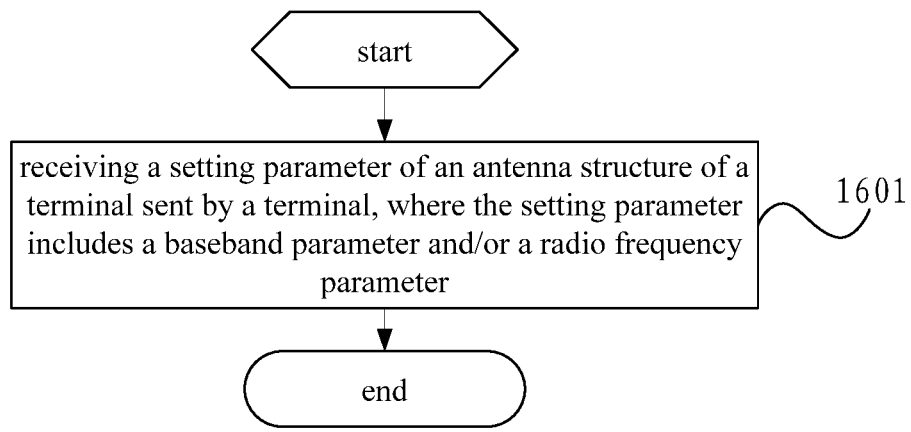
FIG. 16 is a flowchart of a method for acquiring terminal information in some embodiments of the present disclosure.

FIG. 16 is a flowchart of a method for acquiring terminal information in some embodiments of the present disclosure. The implementation process of the method for acquiring terminal information will be specifically described below in conjunction with FIG. 16.

A method for acquiring terminal information is provided in some embodiments of the present disclosure, applied to a base station and including:

Step 1601: receiving a setting parameter of an antenna structure of a terminal sent by a terminal, where the setting parameter includes a baseband parameter and/or a radio frequency parameter;

the baseband parameter includes: a quantity of transceiver units supported by the terminal;

the radio frequency parameter includes one or more of: a quantity of panels, frequency information supported by each panel, a quantity of beams supported by each panel, and a quantity of antenna array polarization directions of each panel.

Optionally, Step 1601 further includes:

receiving, in a random access procedure, a feedback message including a first type of attribute information of the terminal sent by the terminal, where the first type of attribute information of the terminal includes the setting parameter of the antenna structure of the terminal.

Specifically, the feedback message is a random access preamble message or a radio resource control (RRC) connection request message.

Optionally, the method further includes:

prior to the random access procedure, transmitting a synchronization signal to the terminal;

where the receiving, in the random access procedure, the feedback message including the first type of attribute information of the terminal sent by the terminal includes:

receiving, in the random access procedure, the feedback message including the first type of attribute information of the terminal and the optimal downlink transmitting beam information determined based on a receiving strength of the synchronization signal and measured on each panel by the terminal which are sent by the terminal.

Optionally, the method further includes:

in the random access procedure or subsequent to the random access procedure, transmitting a matching beam to the terminal based on the setting parameter;

receiving the optimal downlink transmitting beam information determined based on a receiving strength of the matching beam and measured on each panel by the terminal which is sent by the terminal.

Optionally, Step 1601 includes:

transmitting a terminal capability enquiry message to the terminal, after an RRC connection with the terminal is established;

receiving terminal capability information fed back based on the terminal capability enquiry message by the terminal, where the terminal capability information includes a first type of attribute information and a second type of attribute information of the terminal or the terminal capability information includes a first type of attribute information of the terminal, where the first type of attribute information includes the setting parameter, and the second type of attribute information is evolved universal mobile telecommunications system (UMTS) terrestrial radio access capability information.

Specifically, subsequent to the receiving the terminal capability information fed back based on the terminal capability enquiry message by the terminal, the method further includes:

transmitting a matching beam to the terminal based on the setting parameter;

receiving the optimal downlink transmitting beam information measured on each panel by the terminal which is fed back by the terminal based on a receiving strength of the matching beam.

Specifically, the optimal downlink transmission beam information includes: identifier information of the panel where the optimal downlink transmission beam is measured and identifier information of the optimal downlink transmission beam.

It should be noted that, in the foregoing embodiment, all the descriptions about the base station side are applicable to the method for acquiring the terminal information applied to the base station. According to the method for acquiring terminal information in some embodiments of the present disclosure, the terminal sends the setting parameter of its own antenna structure to the base station, so that the network side knows the antenna array structure information of the terminal, and then in the subsequent use, the network side is able to provide a more efficient beam management, more precise beam alignment, more optimized multi-user scheduling and multi-data flow transmission to the system when using more antennas for user scheduling and data transmission.

Figure 17:
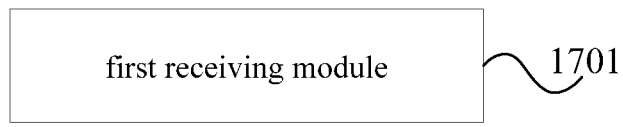
FIG. 17 is a first schematic view of a base station in some embodiments of the present disclosure.
Figure 18:
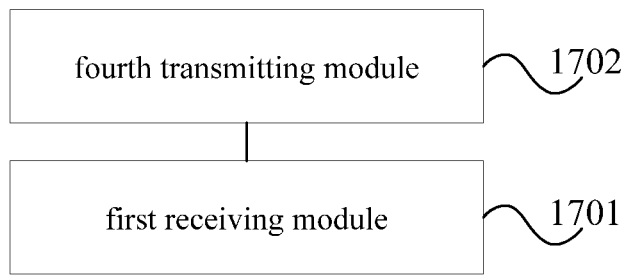
FIG. 18 is a second schematic view of a base station in some embodiments of the present disclosure.
Figure 19:
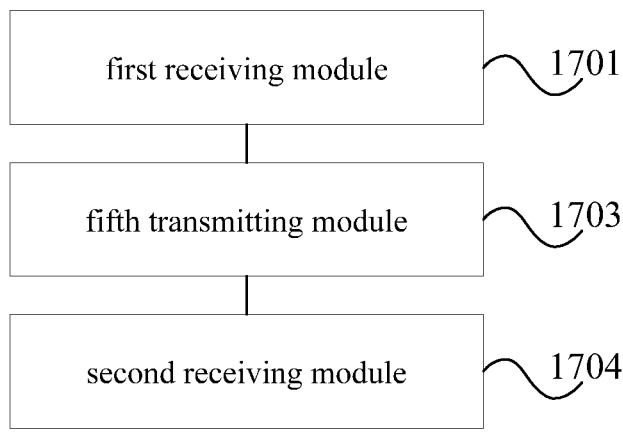
FIG. 19 is a third schematic view of a base station in some embodiments of the present disclosure.
Figure 20:
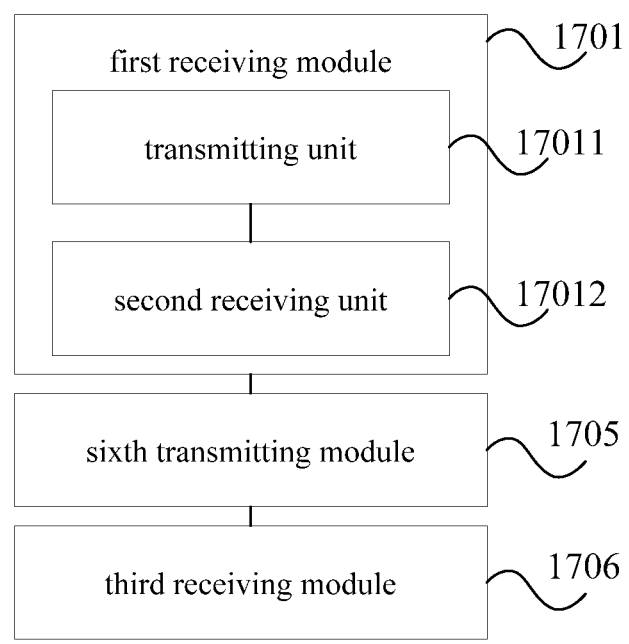
FIG. 20 is a fourth schematic view of a base station in some embodiments of the present disclosure.

FIG. 17 is a first schematic view of a base station in some embodiments of the present disclosure. The base station based on the method for acquiring terminal information is specifically described below with reference to FIG. 18 to FIG. 20.

A base station is further provided in some embodiments of the present disclosure, including:

a first receiving module 1701, configured to receive a setting parameter of an antenna structure of a terminal sent by a terminal, where the setting parameter includes a baseband parameter and/or a radio frequency parameter;

the baseband parameter includes: a quantity of transceiver units supported by the terminal;

the radio frequency parameter includes one or more of: a quantity of panels, frequency information supported by each panel, a quantity of beams supported by each panel, and a quantity of antenna array polarization directions of each panel.

Optionally, the first receiving module 1701 is configured to:

receive, in a random access procedure, a feedback message including a first type of attribute information of the terminal sent by the terminal, where the first type of attribute information of the terminal includes the setting parameter of the antenna structure of the terminal.

Specifically, the feedback message is a random access preamble message or a radio resource control (RRC) connection request message.

Optionally, the base station further includes:

a fourth transmitting module 1702, configured to, prior to the random access procedure, transmit a synchronization signal to the terminal;

the first receiving module 1701 is configured to:

receive, in the random access procedure, the feedback message including the first type of attribute information of the terminal and the optimal downlink transmitting beam information determined based on a receiving strength of the synchronization signal and measured on each panel by the terminal which are sent by the terminal.

Optionally, the base station further includes:

a fifth transmitting module 1703, configured to, in the random access procedure or subsequent to the random access procedure, transmit a matching beam to the terminal based on the setting parameter;

a second receiving module 1704, configured to receive the optimal downlink transmitting beam information determined based on a receiving strength of the matching beam and measured on each panel by the terminal which is sent by the terminal.

Optionally, the first receiving module 1701 includes:

a transmitting unit 17011, configured to transmit a terminal capability enquiry message to the terminal, after an RRC connection with the terminal is established;

a second receiving unit 17012, configured to receive terminal capability information fed back based on the terminal capability enquiry message by the terminal;

where the terminal capability information includes a first type of attribute information and a second type of attribute information of the terminal or the terminal capability information includes a first type of attribute information of the terminal, where the first type of attribute information includes the setting parameter, and the second type of attribute information is evolved universal mobile telecommunications system (UMTS) terrestrial radio access capability information.

Optionally, the base station further includes:

a sixth transmitting module 1705, configured to transmit a matching beam to the terminal based on the setting parameter;

a third receiving module 1706, configured to receive the optimal downlink transmitting beam information measured on each panel by the terminal which is fed back by the terminal based on a receiving strength of the matching beam.

Specifically, the optimal downlink transmission beam information includes: identifier information of the panel where the optimal downlink transmission beam is measured and identifier information of the optimal downlink transmission beam.

According to the base station in some embodiments of the present disclosure controls, the first receiving module 1701 receives the setting parameters of the antenna structure of the terminal to the base station, so that the network side may know the antenna array structure information of the terminal, and then in the subsequent use, the network side is able to provide a more efficient beam management, more precise beam alignment, more optimized multi-user scheduling and multi-data flow transmission to the system when using more antennas for user scheduling and data transmission.

The above are some embodiments of the present disclosure. A person skilled in the art may make further modifications and improvements without departing from the principle of the present disclosure, and these modifications and improvements shall also fall within the scope of the present disclosure.

What is claimed is:

1. A method for reporting terminal information, applied to a terminal and comprising:
   transmitting a setting parameter of an antenna structure of a terminal to a base station, wherein the setting parameter comprises a radio frequency parameter; wherein the radio frequency parameter comprises one or more of: frequency information supported by each panel, a quantity of beams supported by each panel, and a quantity of antenna array polarization directions of each panel, wherein each panel consists of at least one antenna array;
   wherein the transmitting the setting parameter of the antenna structure of the terminal to the base station comprises:
   transmitting, in a random access procedure, a feedback message comprising a first type of attribute information of the terminal to the base station, wherein the first type of attribute information of the terminal comprises the setting parameter of the antenna structure of the terminal;
   wherein subsequent to the transmitting, in the random access procedure, the feedback message comprising the first type of attribute information of the terminal to the base station, the method further comprises:
   in the random access procedure or subsequent to the random access procedure, determining optimal downlink transmitting beam information measured on each panel by the terminal, based on a receiving strength of a matching beam sent by the base station based on the setting parameter;
   transmitting the optimal downlink transmitting beam information measured on each panel by the terminal to the base station;
   wherein the optimal downlink transmission beam information comprises: identifier information of the panel where the optimal downlink transmission beam is measured and identifier information of the optimal downlink transmission beam.

2. The method according to claim 1, wherein the feedback message is a random access preamble message or a radio resource control (RRC) connection request message.

3. The method according to claim 1, wherein prior to the transmitting, in the random access procedure, the feedback message comprising the first type of attribute information of the terminal to the base station, the method further comprises:
   prior to the random access procedure, determining optimal downlink transmitting beam information measured on each panel by the terminal, based on a receiving strength of a synchronization signal sent by the base station;
   wherein the transmitting, in the random access procedure, the feedback message comprising the first type of attribute information of the terminal to the base station further comprises:
   transmitting, in the random access procedure, the feedback message comprising the first type of attribute information of the terminal and the optimal downlink transmitting beam information measured on each panel by the terminal to the base station.

4. The method according to claim 1, wherein the transmitting the setting parameter of the antenna structure of the terminal to the base station comprises:
   receiving a terminal capability enquiry message sent by the base station, after an RRC connection with the base station is established;
   feeding back terminal capability information to the base station based on the terminal capability enquiry message, wherein the terminal capability information comprises a first type of attribute information and a second type of attribute information of the terminal or the terminal capability information comprises a first type of attribute information of the terminal, wherein the first type of attribute information comprises the setting parameter of the antenna structure of the terminal, and the second type of attribute information is evolved universal mobile telecommunications system (UMTS) terrestrial radio access capability information.

5. The method according to claim 4, wherein subsequent to the feeding back the terminal capability information to the base station based on the terminal capability enquiry message, the method further comprises:
   determining optimal downlink transmitting beam information measured on each panel by the terminal, based on a receiving strength of a matching beam sent by the base station based on the setting parameter;
   transmitting the optimal downlink transmitting beam information measured on each panel by the terminal to the base station.

6. The method according to claim 5, wherein the optimal downlink transmission beam information comprises: identifier information of the panel where the optimal downlink transmission beam is measured and identifier information of the optimal downlink transmission beam.

7. A terminal, comprising: a memory, a processor and computer program stored in the memory and operable on the processor, wherein the processor executes the computer program to:
   transmit a setting parameter of an antenna structure of a terminal to a base station, wherein the setting parameter comprises a radio frequency parameter; wherein
   the radio frequency parameter comprises one or more of: frequency information supported by each panel, a quantity of beams supported by each panel, and a quantity of antenna array polarization directions of each panel, wherein each panel consists of at least one antenna array;
   the processor executes the computer program to:
   transmit, in a random access procedure, a feedback message comprising a first type of attribute information of the terminal to the base station, wherein the first type of attribute information of the terminal comprises the setting parameter of the antenna structure of the terminal;
   in the random access procedure or subsequent to the random access procedure, determine optimal downlink transmitting beam information measured on each panel by the terminal, based on a receiving strength of a matching beam sent by the base station based on the setting parameter;
   transmit the optimal downlink transmitting beam information measured on each panel by the terminal to the base station;
   wherein the optimal downlink transmission beam information comprises: identifier information of the panel where the optimal downlink transmission beam is measured and identifier information of the optimal downlink transmission beam.

8. The terminal according to claim 7, wherein the processor executes the computer program to:
   receive a terminal capability enquiry message sent by the base station, after an RRC connection with the base station is established;

feed back terminal capability information to the base station based on the terminal capability enquiry message, wherein the terminal capability information comprises a first type of attribute information and a second type of attribute information of the terminal or the terminal capability information comprises a first type of attribute information of the terminal, wherein the first type of attribute information comprises the setting parameter of the antenna structure of the terminal.

9. A method for acquiring terminal information, applied to a base station and comprising:
receiving a setting parameter of an antenna structure of a terminal sent by a terminal, wherein the setting parameter comprises a radio frequency parameter; wherein the radio frequency parameter comprises one or more of: frequency information supported by each panel, a quantity of beams supported by each panel, and a quantity of antenna array polarization directions of each panel, wherein each panel consists of at least one antenna array;
wherein the receiving the setting parameter of the antenna structure of the terminal sent by the terminal comprises:
receiving, in a random access procedure, a feedback message comprising a first type of attribute information of the terminal sent by the terminal, wherein the first type of attribute information of the terminal comprises the setting parameter of the antenna structure of the terminal;
wherein the method further comprises:
in the random access procedure or subsequent to the random access procedure, transmitting a matching beam to the terminal based on the setting parameter;
receiving the optimal downlink transmitting beam information determined based on a receiving strength of the matching beam and measured on each panel by the terminal which is sent by the terminal;
wherein the optimal downlink transmission beam information comprises: identifier information of the panel where the optimal downlink transmission beam is measured and identifier information of the optimal downlink transmission beam.

10. The method according to claim 9, wherein the feedback message is a random access preamble message or a radio resource control (RRC) connection request message.

11. The method according to claim 9, further comprising:
prior to the random access procedure, transmitting a synchronization signal to the terminal;
wherein the receiving, in the random access procedure, the feedback message comprising the first type of attribute information of the terminal sent by the terminal comprises:
receiving, in the random access procedure, the feedback message comprising the first type of attribute information of the terminal and the optimal downlink transmitting beam information determined based on a receiving strength of the synchronization signal and measured on each panel by the terminal which are sent by the terminal.

12. The method according to claim 9, wherein the receiving the setting parameter of the antenna structure of the terminal sent by the terminal comprises:
transmitting a terminal capability enquiry message to the terminal, after an RRC connection with the terminal is established;
receiving terminal capability information fed back based on the terminal capability enquiry message by the terminal, wherein the terminal capability information comprises a first type of attribute information and a second type of attribute information of the terminal or the terminal capability information comprises a first type of attribute information of the terminal, wherein the first type of attribute information comprises the setting parameter, and the second type of attribute information is evolved universal mobile telecommunications system (UMTS) terrestrial radio access capability information.

13. The method according to claim 12, wherein subsequent to the receiving the terminal capability information fed back based on the terminal capability enquiry message by the terminal, the method further comprises:
transmitting a matching beam to the terminal based on the setting parameter;
receiving the optimal downlink transmitting beam information measured on each panel by the terminal which is fed back by the terminal based on a receiving strength of the matching beam.

14. The method according to claim 13, wherein the optimal downlink transmission beam information comprises: identifier information of the panel where the optimal downlink transmission beam is measured and identifier information of the optimal downlink transmission beam.

15. A base station, comprising a memory, a processor and a computer program stored in the memory and operable on the processor, wherein the processor executes the computer program to perform the method for acquiring terminal information according to claim 9.

* * * * *